Figure 1:
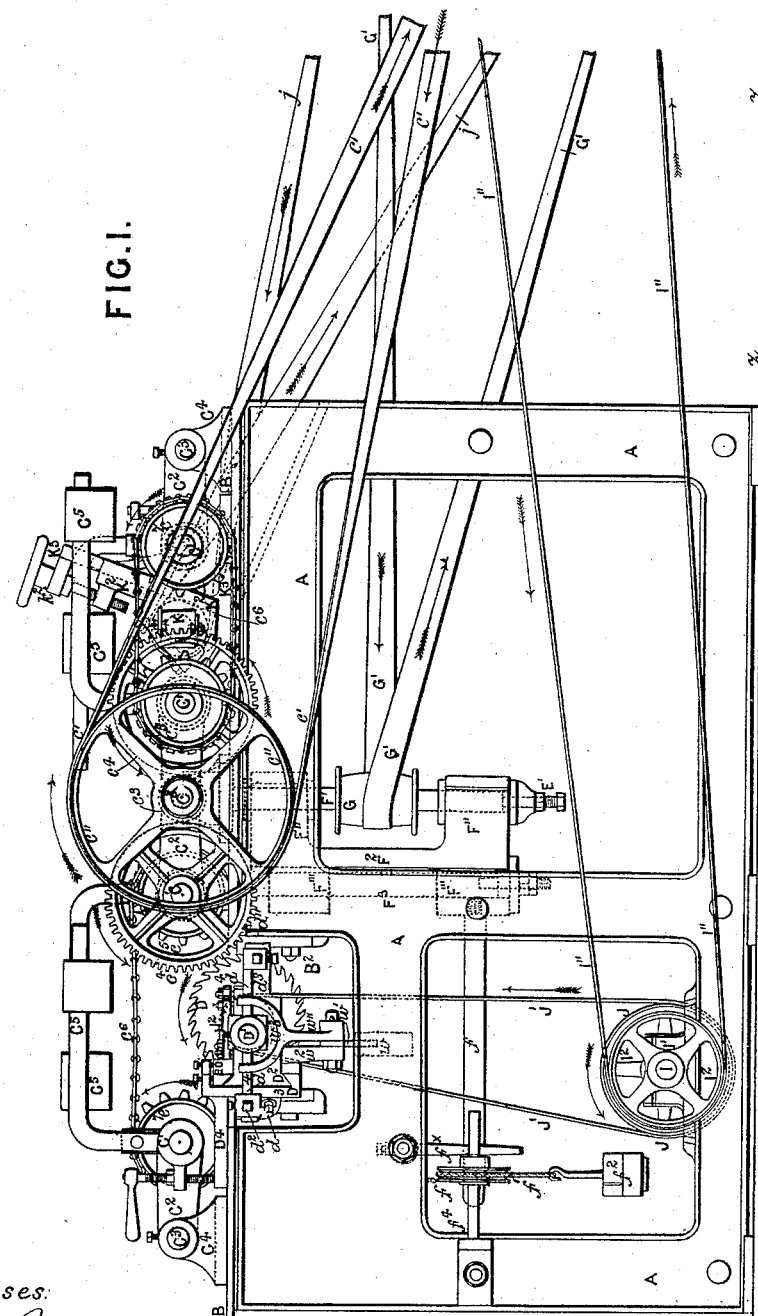

(No Model.) 4 Sheets—Sheet 1.

S. WRIGHT.
MACHINE FOR PREPARING AND JOINTING STAVES FOR CASKS AND BARRELS.

No. 469,459. Patented Feb. 23, 1892.

Witnesses:
George Baumann
John Revell

Inventor
Samuel Wright
By his Attorneys
Howson and Howson (No Model.)  4 Sheets—Sheet 2.

S. WRIGHT.
MACHINE FOR PREPARING AND JOINTING STAVES FOR CASKS AND BARRELS.

No. 469,459.  Patented Feb. 23, 1892.

Witnesses:
George Baumann
John Revell

Inventor
Samuel Wright
By his Attorneys
Howson and Howson (No Model.) 4 Sheets—Sheet 3.

S. WRIGHT.
MACHINE FOR PREPARING AND JOINTING STAVES FOR CASKS AND BARRELS.

No. 469,459. Patented Feb. 23, 1892.

Witnesses:
George Baumann
John Revell

Inventor
Samuel Wright
By his Attorneys
Howson and Howson (No Model.) 4 Sheets—Sheet 4.
S. WRIGHT.
MACHINE FOR PREPARING AND JOINTING STAVES FOR CASKS AND BARRELS.
No. 469,459. Patented Feb. 23, 1892.
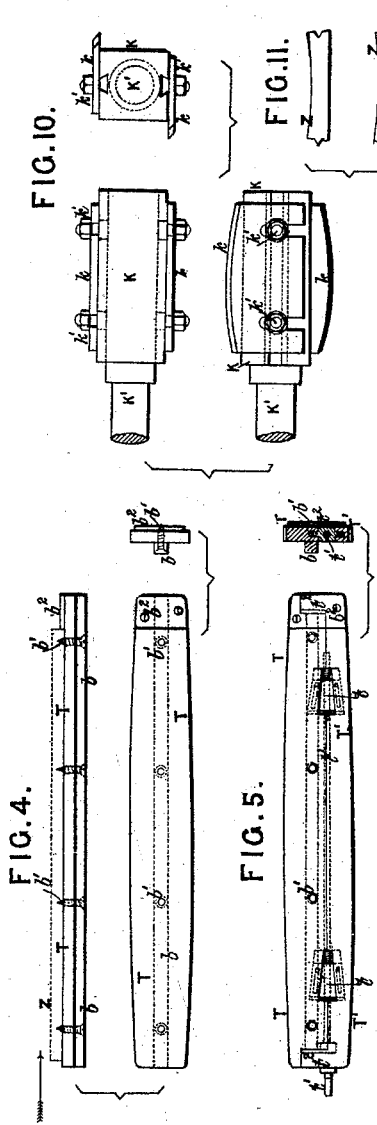
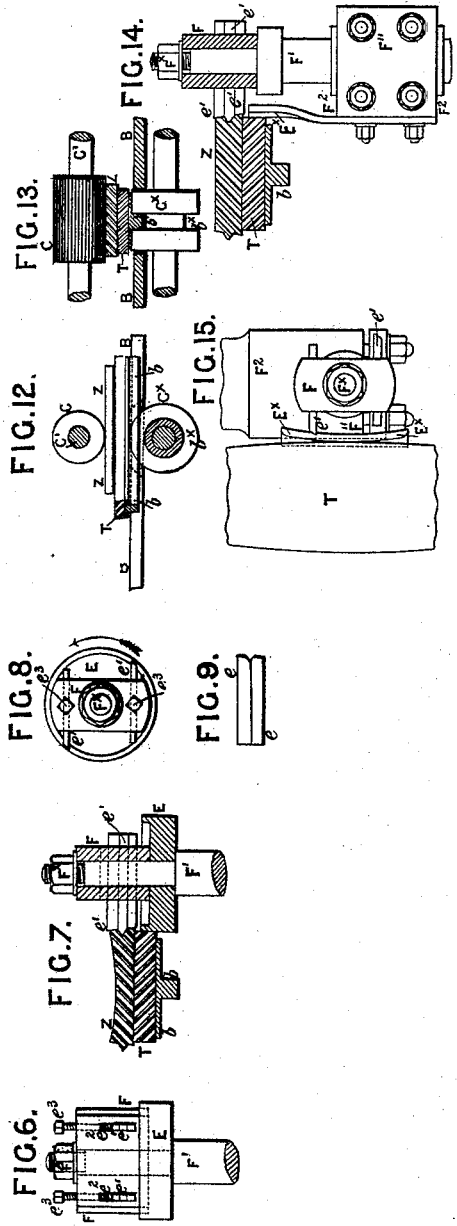
Witnesses:
George Baumann
John Revell
Inventor
Samuel Wright
By his Attorneys
Howson and Howson

United States Patent Office.

SAMUEL WRIGHT, OF GLASGOW, SCOTLAND, ASSIGNOR TO HIMSELF, JAMES MUIR, AND WILLIAM BOYD, OF SAME PLACE.

MACHINE FOR PREPARING AND JOINTING STAVES FOR CASKS AND BARRELS.

SPECIFICATION forming part of Letters Patent No. 469,459, dated February 23, 1892.

Application filed April 21, 1890. Serial No. 348,888. (No model.) Patented in England May 3, 1887, No. 6,456; in Germany March 11, 1888, No. 45,345; in France March 12, 1888, No. 189,286; in Belgium March 13, 1888, No. 81,016; in Italy March 23, 1888, XLVI, 26; in Canada May 29, 1888, No. 29,237; in Spain July 13, 1888, No. 8,244; in Norway July 17, 1888, No. 1,039; in Sweden July 17, 1888, No. 2,105, and in Austria-Hungary October 21, 1888, No. 39,065.

*To all whom it may concern:*

Be it known that I, SAMUEL WRIGHT, machinist, a subject of the Queen of Great Britain and Ireland, residing at 96 Buchanan Street, Glasgow, in the county of Lanark, Scotland, have invented Improvements in Machines for Preparing and Jointing Staves for Casks, Barrels, and such Like Articles, and of which the following is a specification.

Patents have been obtained for said invention in Great Britain, No. 6,456, dated May 3, 1887; in France, No. 189,286, dated March 12, 1888; in Belgium, No. 81,016, dated March 13, 1888; in Spain, No. 8,244, dated July 13, 1888; in Italy, No. 26, Vol. XLVI, dated March 23, 1888; in Germany, No. 45,345, dated March 11, 1888; in Canada, No. 29,237, dated May 29, 1888; in Austria-Hungary, No. 39,065, dated October 21, 1888; in Norway, No. 1,039, dated July 17, 1888, and in Sweden, No. 2,105, dated July 17, 1888.

My said invention has reference to and comprises a new or improved construction of machine or arrangement and combination of mechanism susceptible of considerable modification in the arrangements of its parts for preparing and jointing the edges of staves to a double taper or curved barrel shape, either plain or with tongues and grooves on the jointing edges of the staves for making casks and barrels and such like articles, which will enable such staves to be more accurately made to suit the various-sized widths of wood and bilge of barrels required, with the least possible waste of wood, than has been effected with the machines as heretofore in use.

In order to enable others skilled in the art to which my invention relates to understand the manner in which it may be carried into effect or practice, I have hereunto appended four explanatory sheets of drawings, in which the same reference-letters are used to indicate corresponding parts in all the figures where shown.

Figure 2:
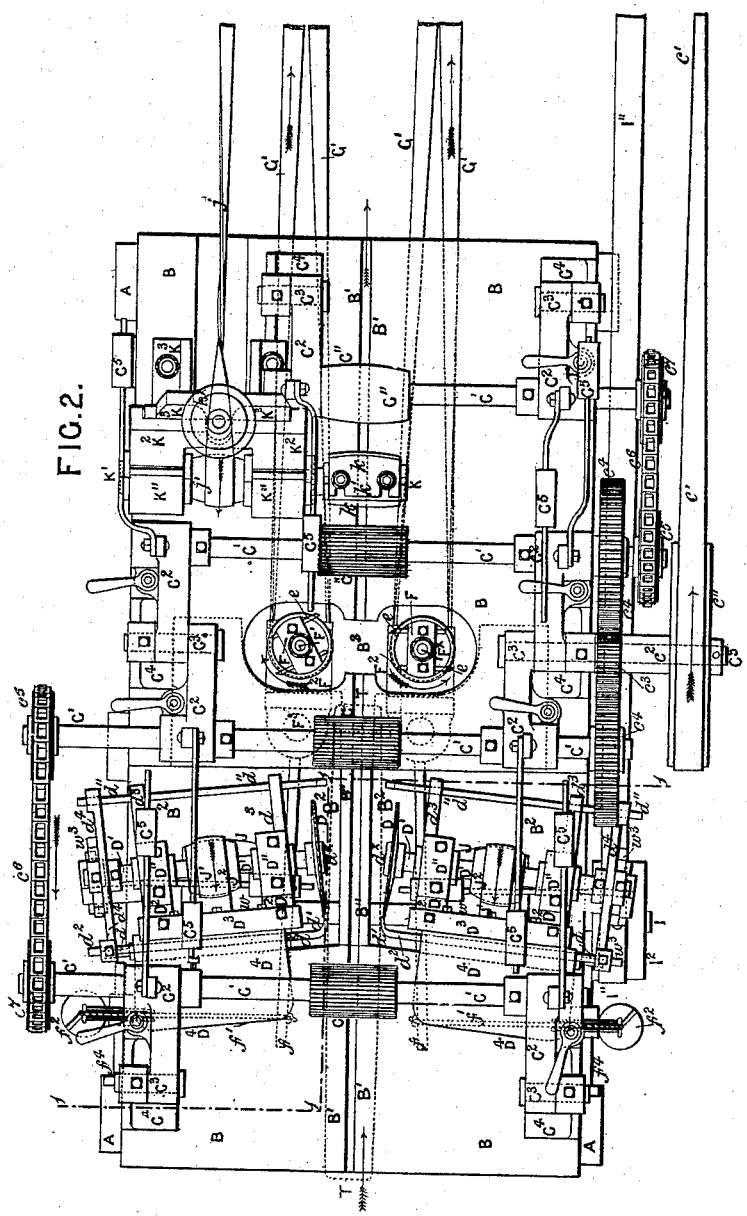
Figure 3:
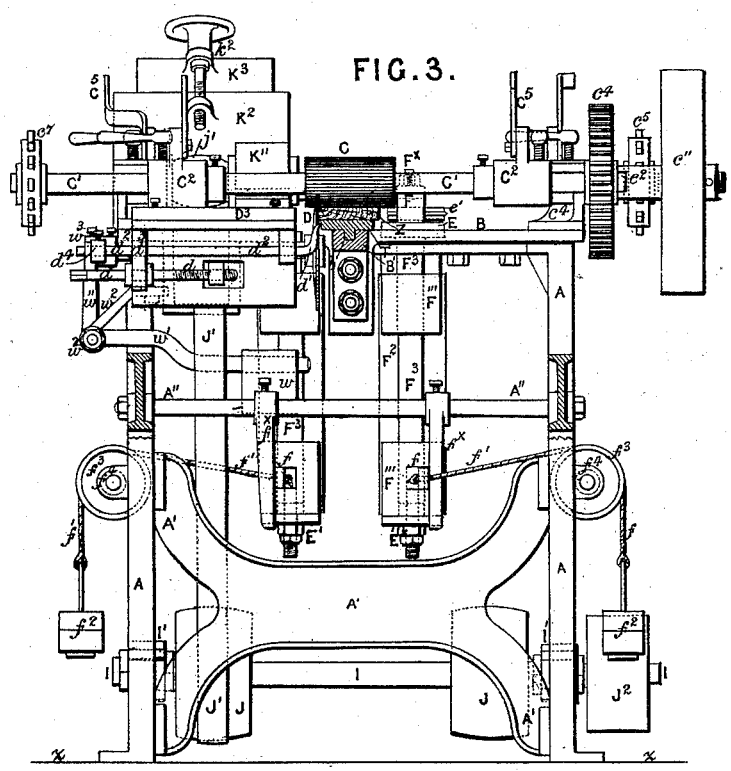

Figures 1 and 2 on Sheets 1 and 2 are a longitudinal elevation and corresponding plan, respectively, of my new or improved machine complete for preparing and jointing staves for casks and barrels, but not showing the counter-shaft from which the machine is driven. Fig. 3 on Sheet 3 is a transverse section as taken near the line 1 1 of Fig. 2. Fig. 4 represents a side view, plan, and end view, respectively, of one construction of the traversing pattern or templet T for determining the size and shape of the stave while it is carried through the machine, while Fig. 5 represents a plan and transverse section, respectively, of a modified construction of stave pattern or templet made in two parts T and T' from that shown in Fig. 4 and in which screwed wedges $t$, connected by a spindle $t'$, are used for adjusting the width of the templet and the width to be given to the stave carried on it. Fig. 6 is an elevation of the cutter head and knives for jointing and shaping the edges of the vertical carrying-staves and for tonguing and grooving them when that is desired; and Fig. 7 is a sectional elevation at right angles to Fig. 6, while Fig. 8 is a corresponding plan of this cutting-tool head. Fig. 9 shows a set of two cutting-tools $e\ e$ for making the tongue on the stave Z. Fig. 10 represents a side elevation, plan, and end view, respectively, showing the hollowing-out stave-cutter K $k$ and its horizontal carrying-spindle K'; and Fig. 11 shows a transverse section of a grooved and feathered stave Z and a plain stave after being delivered from the machine, these detail views Figs. 6 to 11 being shown to a larger scale than in the general views Figs. 1 to 5. Figs. 12 and 13 are a side elevation and transverse section showing a slightly-different arrangement from that shown in the general views Figs. 1 to 3 of the templet T and its carrier for working in the slot B' of the table B, with anti-friction-roller $C^\times$ below the pressing-roller C. Figs. 14 and 15 are an elevation and plan of the cutter-head E E, with a different arrangement of guiding these from the templet T from that shown in Figs. 7 and 8 by a rubbing-plate $E^\times$ instead of by the roller or boss-head E.

Referring to the drawings, the machine consists of two main vertical iron side frames A A, secured at a proper distance apart by transverse stays or frames A' A'', all so as to carry the bearings of the horizontal and vertical driving and working spindles of the machine below and of the feeding-rollers C C'' above the table and fitted with a table-top B for carrying the slotted or slide guides B' B' in the center for traversing the staves Z horizontally and the horizontal and vertical slides and frames of the lateral spindles D' D' on each side for sawing and jointing the edges, as hereinafter more particularly described. The center guide B' B' consists of a simple plain longitudinal groove cut or planed along the center of the front and back parts of the upper metal table B, leaving a gap at $B^2$, and over a continuation B'' of this guide-groove B' of the table B is fitted the traversing metal frame or carriage T $b$, (shown detached in Fig. 4,) carrying the stave Z horizontally on its upper surface or secured on a blank tapered dummy pattern-templet T, made approximately to the double-tapered barreled shape to which the staves Z have to be dressed and jointed. This traversing carriage and blank shaping form $b$ T, with the stave Z secured on it between end pushers and over sharp points $b'$ or other equivalent to prevent the stave from shifting, is carried forward by the feather $b$ on the under side of the plate T, working in the groove B' B'', so as to guide the traveling plate T and stave Z truly through the center of the machine on the table B while being actuated by two, three, or more transverse horizontal feeding-rollers C C'', fitted to roll over it on transverse horizontal shafts C' to press on the stave Z at different convenient parts of its traverse, so that as it passes one roller it will be drawn forward by the one in front and always held firm on its traversing shaping-frame T, while having its edges dressed approximately by small circular saws D D mounted on the adjacent inner ends of horizontal spindles D' D' at each side. The stave Z will then pass on to be jointed plain or with tongues and grooves on the jointing edges by suitable tools on cutting-barrels F, carried on vertical spindles F', working in recesses at $B^3$ through the table B in advance of the saws D to the exact shape desired, regulated by the edges of the shaping-blank T below the stave, as will hereinafter be explained. The horizontal spindles D' of the circular saws D are carried in journal-bearings D'' in the center of lateral movable side slide-frames $D^2$, each portable and fitted in horizontal lateral dovetail or V slides $D^3$, secured by flanged brackets at $D^4$ on each side of the table B of the frame, so as to allow of shifting these slide-frames $D^2$ out or in laterally within recesses or gaps at $B^2$, cut in the opposite sides of the table B and guides B' by long screws $d$ in their guide-frames $D^3$. The saws D are each secured on the inner overhung ends of their spindles D', so as to work and cut close up to the stave, and the spindles D' are made to move laterally in their bearings D'' to suit the double-angled shape of the stave Z the saws D are cutting for the time being, regulated by the shaping-blank T below them acting positively on the inner curved end $d'$ of a slide-bar $d^2$, working parallelly with another rod $d''$ in guides $d^3$ in the frames D'' $D^3$, connected by a cross-head $d^4$, attached between collars to the outer end of each shaft D' of the saws D and so made to traverse the spindles and saws laterally to the shape of the pattern T outward on opposite sides against the power of a weight $w$, Fig. 3, pressing them in through the bell-crank lever $w'$ $w''$, fulcrumed to a bracket at $w^2$, projecting down from the frame $d^3$, so that the bow-arm $w^3$ of the bell-crank presses on the cross-head $d^4$, keeping the guide $d'$ bearing against the pattern T while the stave and its carriage are traversing between the saws D, which will thus cut the stave approximately to the shape desired, leaving sufficient wood on the edges for being truly jointed by the cutting-knives fitted in the jointing-barrels F on vertical spindles considerably in advance of the saws D, as will hereinafter be described.

In place of curved ends $d'$ of the parallel shifting-frame $d^2$ $d''$, bearing on the edges of the blank pattern T, small rollers might be fitted in these ends $d'$ to roll on the pattern and act otherwise, all as described. The vertical spindles F' F' of these jointing knife-heads F F are carried in upper and lower shifting bush-bearings F'' in vertical slide or oscillating frames $F^2$, preferably the latter, so that each spindle F' and its frame $F^2$ will oscillate laterally toward and out from the edge of the staves Z to be cut while passing between them in the center of the machine, as shown in Fig. 1. These frames $F^2$ to so oscillate the cutter-spindles are preferably mounted by journal-bosses F''' at top and bottom on strong central studs $F^3$, secured to and projecting down from the under side of the table B, each actuated by levers $f$, projecting back from the lower bosses F''', and by cords and weights $f'$ $f^2$, passed over guide-pulleys $f^3$, carried on spindles or studs $f^4$, projecting from brackets secured to the side frames A, all so as to press a guide disk or boss E, Figs. 6 and 7, against the templet T under the stave, or it might be a guide-plate, to make the cutters to joint the edges of the staves to the exact shape of the templet T, which would press out the cutters against the power of the lever $f$ and weighted cord $f'$ $f^2$. These vertical spindles F' can be adjusted in their bearings F'' to the proper height by a pinching-screw at E' under each spindle for the knives $e$ in the cutting-head F to joint the edges of the staves Z with tongues and grooves. The levers $f$ are prevented from traveling too far by stop-levers $f^x$, secured on one of the cross-stays A'', as seen particularly in Figs. 1 and 3. The cutter-heads F are thus, as stated, traversed outward in a positive manner on opposite sides by the turned ring or rim E or an equivalent guide-plate at the lower end of their cutting jointing-boss F, rolling on the outer edges of the shaping-blank T, below the stave Z, against the power of the cord and weight $f'$ $f^2$, pressing in each oscillating frame $F^2$ $F''$, carrying the spindle $F'$ of the cutting-boss F.

As seen in Figs. 6, 7, and 8, the cutting-boss head F and its guide-pulley E are preferably secured to a reduced turned part of the upper end of their spindle $F'$ by a screw-nut $F^\times$ on the top, and the narrow steel cutters $e$ or $e'$ for forming the tongues and grooves on the edges of the staves, as seen in Figs. 6 to 9 and 11, are secured in slots at $e^2$ through the boss-head F by pinching-screws $e^3$, and these steel cutters $e$ $e'$ may be made in one, two, or three parts, according to the form of the joint edge of the stave desired—that is, for plain jointing only one blade $e$ is necessary in each recess $e^2$ and for tonguing two knives are required in each recess, as shown in Fig. 9, and for grooving three blades $e'$ are preferred, one for forming the groove and two for forming the joint on each side of the groove, as seen particularly in Fig. 7.

Fig. 11 shows sections of the stave Z both tongued and grooved and plain.

In Fig. 4 is shown a plain form of the traversing shaping pattern or templet T with rib $b$ on its lower side for working in the groove $B'$ in the stationary table B, as seen in Fig. 3. This pattern or templet T may be either made of wood or metal; but the lower sliding part $b$ would preferably be made of metal and have sharp points $b'$ projecting up through the templet-pattern T, entering the stave Z, to be shaped and jointed, as shown dotted in and which is placed on the top of the points $b'$ and in front of the pushing projections $b^2$, the rollers C pressing down the stave and carrying it and its traversing guide-templet T along the guide $B'$ in the table B forward, so as to be cut by the saws D and jointing boss-heads and knives F, all as described.

In Fig. 5 is shown a modification of this templet, which is made in two parts T T', the feather $b$ being secured to the under side of the former, while the two parts are attached by inclined-plane nuts with slotted grooves and guide-pins at $t$, mounted at opposite ends on a screw-spindle $t'$, which shifts these inclined or wedge nuts $t$ and so opens or closes the two parts T T' to make it wider or narrower to suit different-sized staves in a few minutes and so save having a great number of different-sized plain templets T, as shown in Fig. 4, the two parts T T' being half-checked and guided together at their ends $t^2$. A first-motion counter shaft (not shown in the drawings) would be mounted on pillow-blocks projecting up from the floor $z$ out from the back end of the machine, (indicated by a dotted line at $z'$ in Figs. 1 and 2,) where the driving-belts are all shown as broken away, which drive the whole of the spindles of the machine in the direction indicated by the arrows on these and the belts. The counter-shaft at $z'$ would be actuated from any rotative shaft of the works. These vertical jointing-spindles $F'$ are preferably driven by pulleys G at their lower ends driven by half-twist belts or bands $G'$, passed backward (or it might be forward) over a pulley on the counter or first-motion shaft $z'$ of the machine. The first-motion horizontal shaft at $z'$ is also made to drive a horizontal shaft I, carried in bearing-blocks $I'$ on the side frames A A below the saw-spindles $D'$ $D'$ of the machine, by a band $I''$, passed over a pulley $I^2$ on it from a driving-pulley on the first-motion shaft $z'$. As seen in Figs. 2 and 3, broad band-pulleys J are fitted on this forward shaft I with open bands $J'$, carried up from these over pulleys $J^2$, fitted on the center of the spindles $D'$ of the saws D to drive these at a very high of speed, all in the direction indicated by the arrows in Figs. 1 and 2. As the spindles $D'$ of the saws D would have to lie at a considerable angle transversely and horizontally to suit the double-angular shape they have to cut the staves, the saws are preferably made concave on their front face to give clearance next the staves and convex on the opposite side, secured by a round screw-nut $d^\times$ on the extreme end of the spindle $D'$, and the driving-pulleys J $J^2$ would preferably be considerably rounded for flat belts or be driven with groove-pulleys for round bands to allow of the free lateral motion of their spindles and bands during the cutting of the staves Z to their said double-tapered or bilge shape, all as hereinbefore described. The staves Z when fed into the machine would preferably be wider at the middle part than at the ends. Thus a two-inch stave would be made two and a quarter inches at the middle, and a three inch stave three and three-eighths inches at the middle, and so on, which would give the advantage that any number of staves could be used to form the same size of cask or barrel. One feed-roller C and its spindle $C'$ are fitted in front of the saws D and another between the saws and the vertical frames $F^2$, carrying the jointing-spindles $F'$ and other two rollers $C''$ in advance of these jointing-spindles $F'$ on opposite sides of a cutting boss-head K for hollowing out the upper surface of the staves, all as will hereinafter be explained, and as shown in detail views in Fig. 10. These rollers C are preferably grooved, and the spindle $C'$ carried in bearing oscillating brackets $C^2$, and fulcrum studs or centers $C^3$ in brackets $C^4$, projecting up from the top plate B over each side frame A A of the machine and pressed down by weighted levers $C^5$ (or it might be springs or other equivalents) to enable the feed-rollers C $C''$ to press down on the stave Z and carry it forward to be cut and also its traversing templet T and bed $b$ over the groove $B'$ in the center of the table B, so as to have its edges all cut by the saws D and jointed and tongued and grooved by the boss-heads F and their cutters $e$ $e'$ and hollowed out on the upper surface by the cutting-barrel K. The spindles C' of these feed-rollers C are primarily driven at a slow feeding speed by the cross-belt $c'$ from a small pulley on the counter-shaft $z'$, passed over the large pulley $c''$ on a hollow spindle or sleeve eye $c^2$ with a pinion $c^3$ on its inner end, both running on a strong stud in one of the central studs $C^3$, carried in a central bracket $c^4$. This spur-pinion $c^3$ gears into corresponding wheels $c^4$ on the spindles C' C' of the central feed-rollers C C'' on either side of the jointing-heads F F. Chain-wheels $c^5$ on the outer ends of these spindles C' C' of the central feed-roller C C'' are geared by chains $c^6$ to corresponding wheels $c^7$ on the spindles C' C' of the entering and discharge feed-rollers C C''. Instead of carrying the transverse spindles C' C' of all these feed-rollers C C'' in oscillating brackets $C^2$, as shown, they might be, as in many other wood-cutting machines, carried in raising and lowering bush-bearings in slotted vertical guides pressed down by spiral springs and pinching-screws or by weighted or spring-loaded levers. A horizontal spindle K', with a central cutting-barrel K and knives $k$ secured by nuts $k'$ on it, as shown in detail views in Fig. 10, is mounted between the front grooved feeding-roller C and the plain rounded feeding delivery-roller C'' in bearings K'' of a vertical or angular slide-frame $K^2$, working on dovetail slide-guides on a strong bracket-frame $K^3$, bolted to the one side of the top plate B of the machine and actuated by a hand-screw and screw-wheel $k^2$ to raise and lower the frame K'' $K^2$ and spindle K' and cutter-head K, so that the knives $k$ hollow out the upper part of the staves to the desired thickness and curves for size of barrels, according to the shape of the knives $k$ used in the central cutting-barrel K, the knives $k$ being shifted and secured on the cutter-head K by dovetail-headed screws and nuts $k'$. This cutting-spindle K' is also driven by a twist-belt $j$ passed over the small pulleys $j'$ on the spindle K' from a large pulley on the counter-shaft $z'$, and all the cutting-spindles will be made to rotate and cut against or in the opposite direction to the traversing motion of the stave Z, as will be seen by the arrows in Figs. 1 and 2.

In some cases, as shown in longitudinal and transverse sectional details in Figs. 12 and 13, an under feeding-roller $C^\times$ might be fitted in bearing-brackets secured under the table B, so as to work up through recesses cut in the surface by the cutting-barrel K. The spindles C' of these feed-rollers C are primarily driven at a slow feeding speed by the cross-belt $c'$ from a small pulley on the counter-shaft $z'$, passed over the large pulley $c''$ on a hollow spindle or sleeve eye $c^2$ with a pinion slide part B' for it in the table and have a groove $b^\times$ cut in the center of this roller to clear the guide-feather $b$ and press on the inner plate of the templet T and receive the strain of the upper feed-rollers C C'' and so roll and traverse forward the stave Z and its templet T between the rollers C, C'', and $C^\times$, all without friction on the grooved slide part B' of the bed-table B.

Figs. 14 and 15 on Sheet 4 show an elevation and plan, respectively, of the top of one of the spindles F' and its carrying-frame $F^2$ F'' of the cutting-heads F for jointing the staves to the size and shape of the templets T by means of a segmental guide-plate $E^\times$, secured to the top of the oscillating frame $F^2$ F'' to glide over the edges of the templet T, instead of the guiding-disk E described in reference to Figs. 6 to 8.

What I claim is—

1. A machine for preparing and jointing staves for barrels and casks, comprising concave saws D and spindle D' and cutters $e\ e'$ in boss-heads E F for jointing the staves, in combination with traversing patterns or templets T T' $b$ and cutter-heads K and cutters $k$ for hollowing out the staves on their inside, substantially as and for the purpose set forth.

2. In a machine for preparing staves for barrels or casks, a traversing templet T $b$, adapted to carry the staves, in combination with concave saws D, mounted on horizontal spindles on each side of the templet, adjustable slides carrying the said spindles and adapted to be guided by the templet, with vertical boss-heads E F, provided with cutting-tools $e\ e'$, adapted to be guided by the templet, substantially as and for the purposes set forth.

3. In a machine for preparing staves for casks or barrels, the combination of a horizontal table having a longitudinal groove in the surface thereof with a pattern-templet of the same contour as the stave and provided with pointed projections to hold the staves and a projection to work in the said groove to guide the templet and feed-rollers to press on the stave and drive the stave and templet forward, substantially as described.

In testimony whereof I have signed my name to this specification in the presence of two subscribing witnesses.

SAMUEL WRIGHT.

Witnesses:
JOHN SIME,
R. C. THOMSON.